United States Patent [19]

Schwenninger

[11] 3,941,577
[45] Mar. 2, 1976

[54] METHOD AND APPARATUS FOR MAKING MOLTEN GLASS

[75] Inventor: Ronald L. Schwenninger, Cumberland, Md.

[73] Assignee: PPG Industries, Inc., Pittsburgh, Pa.

[22] Filed: Nov. 29, 1974

[21] Appl. No.: 528,373

[52] U.S. Cl. .................. 65/136; 65/179; 65/337
[51] Int. Cl.² .......................................... C03B 5/16
[58] Field of Search ............ 65/134, 135, 136, 178, 65/179, 180, 335, 337, 346, 347

[56] References Cited
UNITED STATES PATENTS
2,397,852   4/1946   Gentil .............................. 65/335 X
3,208,841   9/1965   Burch .............................. 65/135 X Primary Examiner—Arthur D. Kellogg
Attorney, Agent, or Firm—Dennis G. Millman

[57] ABSTRACT

In a continuous, fuel-fired glass melting furnace, a pair of substantially horizontal, longitudinally extending electrodes are provided in the molten glass closely adjacent to the sides of the floating batch blanket for supplying electrically generated booster heat to the underside of the batch blanket. The electrodes extend a substantial distance into the melting zone of the furnace through the fill end wall. The electrodes also serve as physical barriers that prevent the batch blanket from drifting into contact with sidewalls of the furnace. The electrode arrangement boosts melting rates with efficient utilization of electrical energy, and avoids furnace wall erosion and unbalanced melting conditions.

18 Claims, 2 Drawing Figures

METHOD AND APPARATUS FOR MAKING MOLTEN GLASS

BACKGROUND OF THE INVENTION

This invention relates to the melting furnace of a glassmaking operation, and in particular to a method and apparatus in which electric heating is employed to boost the output of a furnace whose primary source of heat is the burning of liquid or gaseous hydrocarbon fuels.

The conventional continuous glass melting furnace is provided with an inlet and an outlet at opposite ends, raw, pulverulent batch material being introduced through the inlet, and molten glass being drawn off at the outlet. The heat for melting and reacting the batch material is furnished by large jets of flame projected across and above the pool of molten glass in the furnace. Since the melting rate of such a furnace is restricted by the limited ability of the walls to withstand high flame temperatures, various proposals have been made to speed the melting rate and boost total output by providing auxiliary electric heaters beneath the surface of the pool of molten glass. Such heaters are generally comprised of two or more electrodes inserted into the molten glass, between which alternating current is passed to heat the glass by the Joule effect. Typical prior art electric booster heating arrangements are shown in the following U.S. Pat Nos.:

2,397,852... Gentil... Apr. 2, 1946
2,749,378... Penberthy... June 5, 1956
2,767,235... Herrold et al... Oct. 16, 1956
2,832,958... Penberthy... Apr. 29, 1958

Although such arrangements may supply some extra heat to the melting operation, they do not provide the most efficient utilization of electrical energy, and they concentrate the heating effect in portions of the molten glass that are closely adjacent to the walls of the furnace, thereby promoting erosion of the walls. This erosion is detrimental not only because furnace life is shortened, but also because it causes greater numbers of particles from the walls to enter the molten glass, which, because they are of a different composition and difficult to melt, appear in the final product as inhomogeneities or defects known as "stones." Each of the above-cited patents shows a relatively large number of short electrodes inserted through the furnace walls. Because current density will be greatest near the electrodes, all of these arrangements produce the hottest temperatures close to the walls, and thus promote erosion of the adjacent wall areas. The Gentil patent also requires the batch material to be melted by the electrodes in small doghouses before entering the furnace. That arrangement places partially melted batch material, which is even more corrosive than molten glass, into direct contact with the doghouse walls, and at the same time requires extremely high temperatures within the small space of the doghouses in order to effect complete melting there. Gentil's doghouse walls would therefore be subject to a high rate of erosion. The erosion could be slowed by cooling the wall areas around each electrode in the prior art arrangements, but to do so would waste a significant portion of the thermal energy provided by the booster heating.

Another problem encountered in continuous glass melting furnaces is the directional instability of the layer of unmelted or partially melted batch material, known as the batch blanket, which floats on the surface of the pool of molten glass. The end of the blanket farthest into the furnace often tends to drift against one of the sidewalls, which not only brings the corrosive batch material into contact with the sidewall, but also establishes a persistent, unsymmetrical heating and circulation pattern in the furnace which is highly undesirable.

It is an object of this invention to overcome the drawbacks associated with electric booster heating in a glassmaking process by providing an arrangement that efficiently directs electrically generated heat to the zone where it is best utilized, while at the same time avoiding increased furnace wall erosion and improving the directional stability of the batch blanket. These and other objects will become apparent from the following description of the invention.

SUMMARY OF THE INVENTION

This invention provides a continuous glass melting furnace with a pair of long electrodes that extend longitudinally and substantially horizontally from the inlet end wall beneath the batch inlet opening along the sides of a substantial portion of the batch blanket. In the preferred embodiment, the electrodes are submerged just beneath the surface of the molten glass, closely adjacent to the sides of the floating batch blanket and spaced from the sidewalls of the furnace. With the electrodes thus located, the passage of current through the molten glass generates heat in the coolest portion of the glass in the melting zone, the portion immediately beneath the blanket of unmelted batch, and yet does not appreciably increase the temperature near the sidewalls. The only wall subjected to significant additional heating action is the inlet end wall, which in most cases will not be detrimentally effected since that wall is the coolest in the melting zone due to its proximity to the cold, newly-introduced batch material.

The electrodes are considerably longer than those previously deployed in such a position in the prior art, thereby yielding a number of advantages. Because of the greater length, a given power input is distributed over a larger area, and thus a large amount of thermal energy can be added to the furnace without creating unduly high temperatures in the vicinity of the electrodes. Because of this relatively low power density, erosion of the wall through which the electrodes are inserted will not be appreciably increased. Further advantages are realized from the present invention when it is desired or becomes necessary to additionally impede erosion at the conjunction of the electrodes and the end wall by applying cooling means (such as water-cooled pads) to the wall. Since the electric booster heating of this invention is provided by two large electrodes rather than many small electrodes, cooling can be limited to merely two areas on the end wall, thereby subtracting only a small fraction of the booster energy input. And because of the great length of the electrodes, a large majority of the heating takes place far removed from, and unaffected by, any cooling of the wall.

Another major benefit derived from the inventive electrode arrangement is that the electrodes act as physical barriers that maintain the floating batch blanket spaced from the sidewalls of the furnace, thereby maintaining symmetrical heating conditions in the furnace and preventing the erosion that can occur when the batch comes into contact with the sidewalls. Guiding the batch down the center of the furnace is also advantageous in that better melting conditions are encountered there than along the cooler regions near the sidewalls. Accordingly, the length of the electrodes is selected not only to yield a low power density, but also to provide a lateral restraining effect sufficiently far downstream from the inlet that there is little or no chance of any part of the batch blanket drifting into contact with a sidewall. This guiding function of the electrode arrangement may be realized even when no electric current is being passed through the electrodes. Related to this aspect of the invention is copending application Ser. No. 528,374 of Wright M. Welton filed on even date herewith, assigned to the assignee of the present application, PPG Industries, Inc., and entitled "Method and Apparatus for Making Molten Glass with Batch Guiding Means."

DESCRIPTION OF THE PREFERRED EMBODIMENT

This description refers specifically to the type of furnace conventionally employed in the manufacture of quality flat glass, but it should be apparent that the advantages of the invention render its inclusion in virtiually any continuous glassmaking operation desirable.

Figure 2:
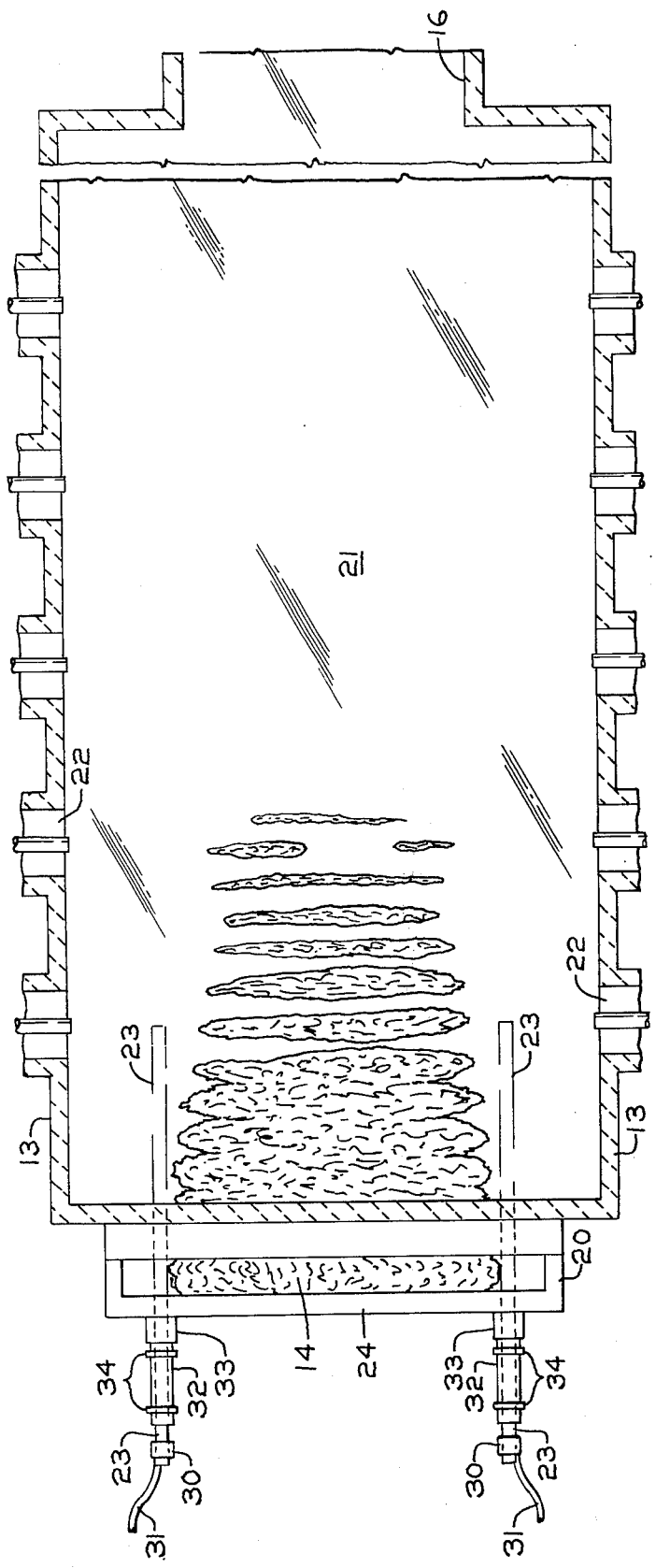
FIG. 2 is a horizontal section through the same furnace shown in FIG. 1.
Figure 1:
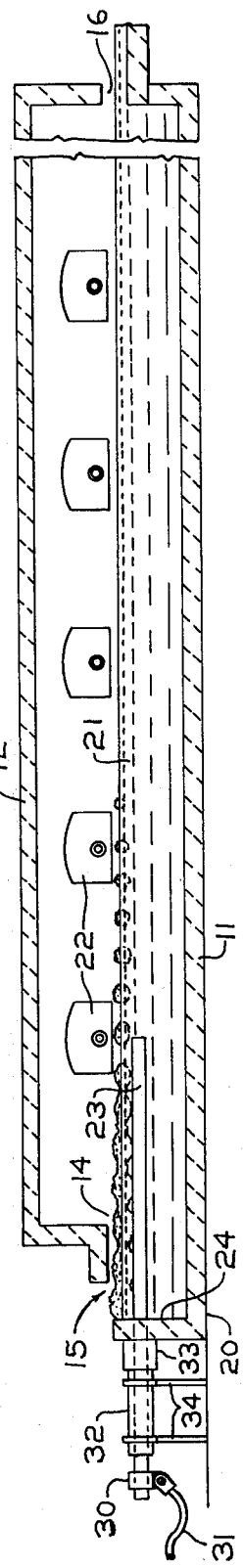
FIG. 1 is a vertical section along the length of a typical glass melting furnace incorporating a preferred embodiment of the present invention.

Referring to FIGS. 1 and 2, there is shown in vertical and horizontal cross-sectional views, respectively, a conventional, continuously fed, cross-tank fired, glass melting furnace having an enclosure formed by bottom 11, roof 12, and sidewalls 13 made of refractory materials. Overall progression of the glass is from left to right in the figures, toward an outlet opening 16 at a downstream location. Glass batch material 14 is introduced through inlet opening 15 in an extension 20 of the furnace known as the fill doghouse. The batch may be introduced intermittently by feeding means (not shown) to form a ridged blanket floating on the surface of the molten glass 21 as shown, or it may be fed continuously to form a uniform blanket. Usually the most effective practice is to feed the batch across approximately the central two-thirds of the furnace width. Heat is provided by flames issuing from burner ports 22 spaced along the sidewalls, which are directed onto and across the molten glass. Although some heat for melting is obtained by conduction from the molten glass, the batch is melted primarily by radiant heat from above. Since unmelted batch acts as a relatively good heat insulator, melting takes place primarily from the top down and is thus not as rapid as is sometimes desired.

In order to supply more heat for melting, the present invention adds electrically generated heat closely adjacent to the underside of the batch blanket by providing a pair of electrodes 23 which extend into the furnace through holes drilled through the end wall 24 beneath the inlet opening. The electrodes may be comprised for commercially available carbon rod electrodes having diameters of several inches and provided in sections that are several feet long and threaded on the ends to permit any number of sections to be connected. Although not required, each electrode may be provided with a small axial bore 4 along its length to permit gases generated at the glass/electrode interface to bleed through the carbon, into the electrode, and pass to the exterior of the furnace rather than generating bubbles in the molten glass. Although other materials are known as suitable for glass furnace electrodes, carbon rods (usually including a significant amount of graphite) are preferred here because of their rigidity at high temperatures and because any erosion of carbon from the electrodes does not contaminate the glass, since glass batch normally includes some carbon as an ingredient. The diameters of the rods will depend upon their lengths, in that sufficient strength must be provided to counteract the bending force produced by the buoyancy of the lighter carbon rods in the molten glass. For example, diameters on the order of about 6 to about 9 inches (15 to 23 centimeters) would be satisfactory for electrodes that penetrate as much as about 20 feet (6 meters) into the molten glass, as would be typical in a large commercial melting furnace. Even longer electrode penetrations are contemplated, however, and can be readily accommodated by utilizing rods with appropriately larger diameters, carbon electrodes as large as 24 inches (62 centimeters) in diameter being commercially available.

In order to direct the booster heat primarily toward the cool underside of the batch blanket, the electrodes are preferably located as close as possible to the sides of the batch blanket and submerged in the molten glass at a minimal depth sufficient to just cover the electrodes and prevent oxidation of the carbon in the atmosphere of the furnace. Preferably, this depth may be on the order of 1 to 2 inches (2.5–5 centimeters) in a large scale commercial furnace. Because the batch extends several inches beneath the molten glass level, the electrodes act as physical barriers to lateral movement of the batch blanket, thus preventing batch material from drifting into contact with the sidewalls. The electrodes may be submerged below the molten glass level as deep as the unmelted batch extends (more than 12 inches (30 centimeters) in some cases), but a minimum depth is preferred for optimum guidance of the blanket. One may, of course, forgo the benefits of batch blanket guidance by deeply submerging the electrodes and yet retain other advantages of the invention. In any case, the electrodes should be no closer to the bottom of the furnace than about half the depth of the molten glass to avoid eroding the bottom.

The electrodes may generally be parallel to the sidewalls of the furnace and in contact with the outside edges of the widest portion of the batch blanket. Since the width of the batch blanket is reduced as melting progresses, it may be advantageous for the electrodes to toe-in slightly to conform to the outline of the batch blanket. Placing the electrodes as close as possible to the sides of the batch blanket concentrates the electric heat beneath the batch blanket and maintains a more stable, symmetrical melting pattern in the furnace, but it is permissible to space the electrodes farther apart than the width of the batch blanket so long as sufficient spacing from the sidewalls is provided to avoid significant additional heating of the sidewalls.

It is preferred that the electrodes be mounted as nearly horizontally as possible to simplify installation and to provide more intimate contact of the underside of the batch blanket with the electric heat. Since the depth of the batch blanket decreases as it moves downstream the electrodes may slope upward a few degrees to follow the general contour of the underside of the blanket, but even in the most extreme cases it can be said that the electrodes would be substantially horizontal.

The specific optimum length for the electrodes will vary from furnace to furnace, and is determined largely by the distance that the batch blanket extends into the furnace, which in turn depends upon the size and geometry of the furnace as well as various process parameters (glass composition, furnace temperatures, etc.). The electrodes should be long enough to distribute the electrical energy across a relatively large area closely adjacent to the underside of a substantial portion of the batch blanket and preferably to also impart sufficient lateral guidance to the blanket to insure that the portion of the blanket beyond the tips of the electrodes will not drift into contact with the sidewalls under normal circumstances. In general, the electrodes should extend into the furnace at least 30 to 100 percent, preferably 50 to 75 percent, of the distance that the batch blanket extends into the furnace, measured from the point of batch introduction to the zone where the blanket begins separating into discrete, freely floating agglomerations of batch known as "logs" or "floaters." However, the electrodes may extend to virtually any distance beyond the end of the batch blanket if additional protection of the sidewalls from floating batch is desired. For example, the electrodes may reach to the region of the furnace where all the batch, including the floaters, has been melted, or they may extend the entire length of the furnace. Lengths coincident with the major portion of the batch blanket length are preferred because the electric energy input is utilized most efficiently there while also obtaining significant improvements in batch guidance.

The melting pattern depicted in FIGS. 1 and 2 may be considered to represent the fastest melting rate that would ordinarily be encountered in such a furnace in the flat glass industry. Such furnaces conventionally have about six to eight burner ports 22 on each side, only the first five being shown in FIGS. 1 and 2. With the primary sources of heat for melting thus spaced along the length of the furnace, the most effective melting temperature would not be encountered until the batch has passed a number of the burner ports at the inlet end. Typically the batch blanket does not begin to break up until it approaches the region of the third or fourth burner port, nearly half the length of the furnace, but blankets reaching only the second burner port or as far as the fifth burner port are not exceptional. For a majority of the melting to have taken place when the batch is opposite the first of a series of burner ports, as shown in FIGS. 1 and 2, it will entail extreme, but theoretically possible, furnace conditions. Thus the desirable lengths for the electrodes may be structurally defined in terms of their relationship to the burner ports, viz., the electrodes should extend into the furnace at least as far as the region approximately opposite the first burner port.

In a furance of the type shown in FIGS. 1 and 2 which includes a fill doghouse extension, conventional furnace geometry is such that the horizontal depth of the doghouse normally represents a small fraction of the distance from the doghouse end wall 24 to the end of the batch blanket. A majority of the batch blanket in such a case would extend beyond the doghouse, into the main body of the furnace. Accordingly, it can be said that electrodes having a portion of their lengths extending through the doghouse should have at least an equal additional length extending into the main body of the furnace.

Another convenient rule of thumb for selecting the electrode length is that the electrodes should preferably extend through the molten glass a distance greater than about half the inside width of the furnace.

As a specific example, consider a furnace of the type shown in FIGS. 1 and 2 whose size and proportions are typical of commercial flat glass manufacturing installations wherein: the furnace is about 30 feet (9 meters) wide, with seven burner ports on each side spaced 10 feet (3 meters) apart from center to center and 10 feet (3 meters) from the ends, the fill doghouse extends about 5 feet (1.5 meters) beyond the back wall, the glass depth is approximately 4 feet (1.2 meters) and the batch blanket is about 20 feet (6 meters) wide and extends to a point between the third and fourth burners. In such a furnace, satisfactory results may be attained by employing a pair of 6-inch (15 centimeter) diameter electrodes that extend 15 feet (4.5 meters) from the doghouse end wall. A preferred embodiment in that case would utilize 8½ inch (21.5 centimeter) diameter electrodes extending about 20 feet (6 meters). Extending the electrodes to 30 feet (9 meters) or more may yield additional protection of the walls from batch contact. The electrodes in each of these specific examples may be spaced about 5 feet (1.5 meter) or one-sixth of the total width from the sidewalls.

Referring again to FIGS. 1 and 2 in general, it can be seen that the preferred mounting arrangement of the electrodes locates a substantial length of the electrodes 23 exteriorly of the furnace, where electrical connections may be made by way of clamps 30 and cables 31. The portion of each electrode adjacent to the doghouse end wall 24 is received in a sheath 32 which is sealed at its outer end and pressurized with an inert gas and/or a reducing gas so as to prevent oxidation of the carbon electrodes that would be caused by air seepage around the hot portions of the electrodes. Additional oxidation prevention is provided by a water-cooled annular chamber 33 around each sheath 32 at the wall end. Sheaths 32 and coolers 33 may be inserted into a counter bore at least part of the way into the thickness of wall 24 to protect the electrodes from oxygen migration through the refractory material of the wall. Cantilever support for each electrode is provided by two spaced brackets 34. The cantilever arrangement relieves the bores and the various connections to the electrodes from the great leverage forces set up by the long, unsupported length of each electrode inside the furnace. The brackets 34 may be insulated from the electrical current carried by the electrodes by interposing an insulating refractory material between each bracket and sheath 32 at the points of contact. When extremely long electrodes are used, it may sometimes be desirable to provide additional vertical restraint with water-cooled hold-down rods extending from the furnace roof and engaging the downstream ends of the electrodes.

The electrical current supplied to the electrodes is preferably single phase alternating current, although multiphase current can be utilized if more than two electrodes are installed. Power consumption may vary widely, depending upon economic considerations, the size of the furnace, and the amount of booster heat desired, consumption of a few hundred to many thousand kilowatts being typical in large commercial furnaces. The current density is preferably limited to less than about 2 amps per square inch (0.31 amp per square centimeter) at the surface of the electrodes in order to avoid undue elevation of the glass temperature that would promote furnace wall erosion.

It should be apparent that other modifications and variations as are known to those of skill in the art may be resorted to without departing from the spirit and scope of the invention as defined by the appended claims.

I claim:

1. In a continuous process for making molten glass wherein glass batch material is introduced into a fuel-fired furnace through an inlet opening at an end wall of the furnace to form a blanket of unmelted batch on the surface of a pool of molten glass within the furnace, the batch material being deposited onto less than the full width of the pool of molten glass so as to form a blanket covering less than the full width of the pool of molten glass and extending longitudinally into the furnace from the inlet end toward an outlet at the opposite end, the improvement comprising generating additional heat beneath the batch blanket by passing electric current through a region of the molten glass between a pair of longitudinally extending electrodes, said region being spaced from the sidewalls of the furnace and closely adjacent to the underside of at least 30% of the length of the batch blanket, said electrodes extending along, and closely adjacent to, the sides of the batch blanket near the surface of the pool of molten glass so as to maintain the batch blanket spaced from the sidewalls of the furnace.

2. The method of claim 1 wherein said region through which said electric current passes underlies about 50 to about 75 percent of the length of the batch blanket.

3. The method of claim 1 wherein the current density at the surface of the electrodes is no more than 2 amps per square inch.

4. In a continuous process for making molten glass wherein glass batch material is introduced into a melting furnace through an inlet opening at an end wall of the furnace to form a blanket of batch material on the surface of a pool of molten glass within the furnace, the blanket extending longitudinally into the furnace from the inlet end toward an outlet at an opposite end, the improvement comprising maintaining the batch blanket spaced from the sidewalls of the furnace by means of rods that extend substantially horizontally through the inlet end wall beneath the inlet opening and through the molten glass along the sides of the batch blanket.

5. A furnace for the continuous production of molten glass comprising:
   an enclosure for holding a volume of molten glass provided with an inlet opening at an end wall, through which glass batch material may be introduced onto the molten glass, and a longitudinally displaced outlet opening through which molten glass may be withdrawn;
   a plurality of burner ports spaced longitudinally along said enclosure for melting the glass batch; and
   a pair of transversely spaced, elongated electrodes extending substantially horizontally and longitudinally through said inlet end wall beneath said inlet opening into said enclosure at least as far as the region opposite the first of said burner ports from the inlet end.

6. The furnace of claim 5 wherein said inlet end wall forms part of a doghouse extension at the inlet end of said enclosure, and said electrodes extend through said doghouse extension and into the main body of the enclosure.

7. The furnace of claim 5 wherein said electrodes are spaced from the bottom and sidewalls of said enclosure.

8. The furnace of claim 7 wherein said electrodes are spaced from each other by about two-thirds of the width of said enclosure.

9. The furnace of claim 7 further including cantilever support means for said electrodes that engage portions of the electrodes extending exteriorly from said inlet end wall.

10. The furnace of claim 9, further including means surrounding exterior portions of said electrodes nearest the inlet end wall for preventing oxidation of said electrodes.

11. A furnace for the continuous production of molten glass comprising:
   an enclosure for holding a volume of molten glass having a doghouse extension at one end, an inlet opening in said doghouse through which glass batch material may be introduced onto the molten glass, and a longitudinally displaced outlet opening through which molten glass may be withdrawn;
   fuel burning means for supplying heat to said enclosure for melting the glass batch; and
   a pair of transversely spaced, elongated electrodes extending substantially horizontally and longitudinally through the inlet end wall beneath said inlet opening, through said doghouse extension, and into the main body of said enclosure, the portion of each electrode within the main body of the enclosure being at least as long as the portion within the doghouse extension.

12. The furnace of claim 11 wherein said electrodes are spaced from the bottom and sidewalls of said enclosure.

13. The furnace of claim 12 wherein said electrodes are spaced from each other by about two-thirds of the width of said enclosure.

14. The furnace of claim 12 further including cantilever support means for said electrodes that engage portions of the electrodes extending exteriorly from said inlet end wall.

15. A furnace for the continuous production of molten glass comprising:
   an enclosure for holding a volume of molten glass provided with an inlet opening at an end wall, through which glass batch material may be introduced onto the molten glass, and a longitudinally displaced outlet opening through which molten glass may be withdrawn;
   fuel burning means for supplying heat to said enclosure for melting the glass batch; and
   a pair of transversely spaced, elongated electrodes extending substantially horizontally and longitudinally through the inlet end wall beneath said inlet opening and into said enclosure, the length of each electrode beyond the inlet end wall being at least half the width of said enclosure.

16. The furnace of claim 15 wherein said electrodes are spaced from the bottom and sidewalls of said enclosure.

17. The furnace of claim 16 wherein said electrodes are spaced from each other by about two-thirds of the width of said enclosure.

18. The furnace of claim 16, further including cantilever support means for said electrodes that engage portions of the electrodes extending exteriorly from said inlet end wall.

* * * * *